(No Model.)

B. B. MERRILL & J. A. WING.
TRUCK.

No. 355,192. Patented Dec. 28, 1886.

Witnesses
S. N. Piper
N. B. Torrey

Inventors
Benj. B. Merrill,
James A. Wing,
by R. H. Eddy atty

UNITED STATES PATENT OFFICE.

BENJAMIN B. MERRILL AND JAMES ARTHUR WING, OF LITTLETON, MASSACHUSETTS.

TRUCK.

SPECIFICATION forming part of Letters Patent No. 355,192, dated December 28, 1886.

Application filed November 1, 1886. Serial No. 217,672. (No model.)

*To all whom it may concern:*

Be it known that we, BENJAMIN B. MERRILL and JAMES ARTHUR WING, of Littleton, in the county of Middlesex, of the Commonwealth of Massachusetts, have invented a new and useful Improvement in Trucks for the Transportation of Merchandise or other Matters; and we do hereby declare the same to be described in the following specification and represented in the accompanying drawings, of which—

Figure 1:
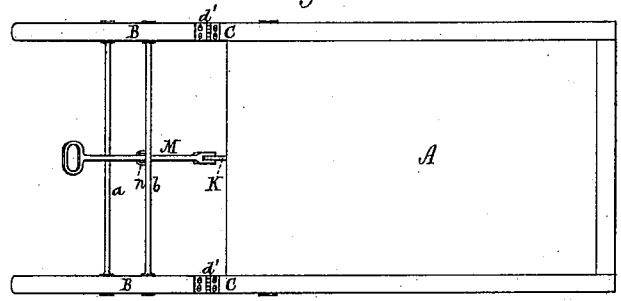
Figure 3:
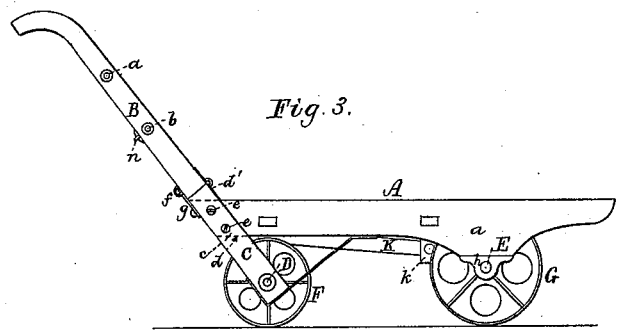
Figure 2:
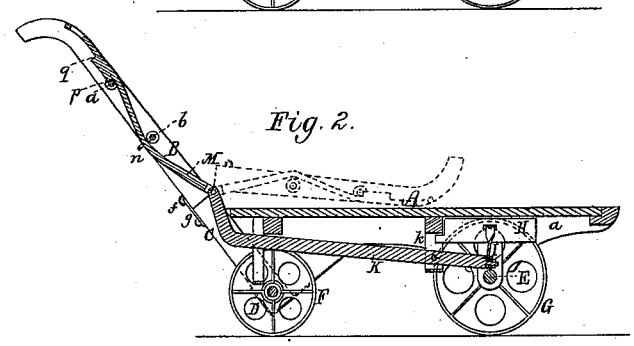
Figure 4:
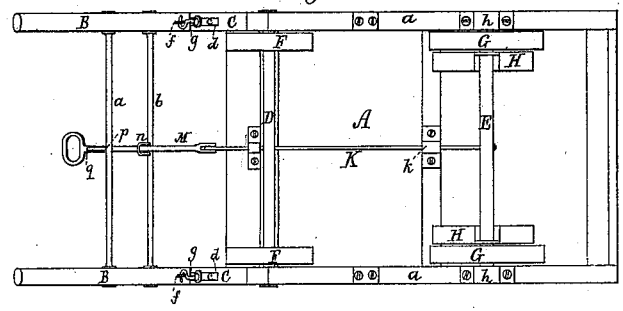
Figure 5:
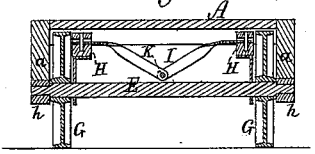

Figure 1 is a top view, Fig. 2 a median and longitudinal section, Fig. 3 a side view, and Fig. 4 an under side or bottom view, of a truck containing our invention. Fig. 5 is a transverse section of it, taken through the axle of the forward pair of wheels.

The nature of our said invention is duly defined in the claims hereinafter presented.

In such drawings, A denotes the platform of the truck, it having side or wheel guards, $a\ a$, projecting down from it at its opposite longer edges. Two handles, B B, connected by cross bars or rods $a\ b$, are hinged to two continuations or bars, C C, that are inclined, as represented, to the guards $a\ a$, and fixed to them by tenons $c$, inserted in mortises $d$ in the bars C C, and by screws $e$, going through each tenon and the bar C thereon. The hinges $d'$ are on the front sides of the handles and bars, there being on the rear side of each handle an eye, $f$, to engage with a hook, $g$, pivoted on the bar, such hook and eye being to hold the handle in line with the inclined bar. When the hooks are disengaged from the eyes, the handles may be turned down upon the platform, as indicated by dotted lines in Fig. 2, such being to enable the truck to be reduced for convenience of package or transportation of it. There are to the truck two axles, D and E, the rear one, D, being journaled in bearings in the bars C C, and furnished with two wheels, F, which are between the said bars. The two wheels G of the forward axle, E, are also between the two guards $a$, the said axle being journaled in boxes $h$, fastened to the guards. The forward wheels are somewhat larger in diameter than the rear wheels. To each of the forward wheels there is a brake, H, which is on the inner side of the wheel, and is pivoted upon the axle. Between the two brakes, and connected to them, are a pair of toggles, I, which incline downward at an obtuse angle to each other, and at their junction are jointed to the inner end of a lever, K, extending along underneath the middle of the platform, and fulcrumed to a projection or bracket, $k$, therefrom, such lever at its rear end being connected with or jointed to a lifter-rod, M, in such manner as to admit of the handles, with the lifter-rod applied to their connecting-bars, being turned down upon the platform into position, as indicated by the dotted lines in Fig. 2. The said lifter-rod or handle goes through a staple or guide, $n$, projecting from the connection-rod $b$, there being to the upper part of the lifter shoulders $p$ and $q$, for it to catch upon the rod $a$ when the lifter is either at its highest or lowest position. By forcing the lifter downward the brakes will be pressed against the wheels, and may be locked in position by such lifter. On pulling the lifter upward the brakes may be thrown off the wheels and locked in position.

The object of having the brakes to the wheels is to prevent the truck from moving while being laden, or to hold it still on an inclined way or upon an elevator while the latter may be in movement.

By having the wheels between the guards such wheels are covered, so as to be prevented from contact with or catching any part of a load on the platform.

We do not claim the combination, with a truck, of brakes applied to its wheels and having mechanism for forcing such brakes against the wheels, and, also, other mechanism for preventing one of the handles from being moved inwardly while the truck is being lifted by its handles, such being to keep the brakes out of action on the wheels, all being as represented in the United States Patent No. 233,292, as we have no such mechanism; but, in combination with the brake-actuating mechanism, we have means of locking the brakes to keep them in action on the wheels. Nor do we claim a truck having its handles hinged directly to the side bars or wheel-guards of such truck, all being as shown in the United States Patents Nos. 183,395 and 269,248, for we have on our truck the handles hinged to continuations or separate pieces fastened to the sides or wheel-guards.

We claim—

1. The truck provided with the brakes arranged between its forward wheels, and having mechanism, essentially as described, for operating and locking them, (the said brakes,) as set forth, relatively to the wheels.

2. The combination, with the truck-platform and its wheel-guards, of handles and their continuations, hinged together and provided with hooks and eyes, as set forth, the handle continuations being fastened to the guards, and the whole being to admit of the handles being turned down upon the platform, as occasion may require.

3. The combination, with the truck-platform and its handles and their connection-rods and with the wheels and their axles, of the brakes applied to the axles and wheels, and of the toggles, their operative lever, and the lifter thereof having shoulders, as set forth, all being substantially as represented.

BENJAMIN B. MERRILL.
JAMES ARTHUR WING.

Witnesses:
R. H. EDDY,
R. B. TORREY.